(12) United States Patent
Okubo

(10) Patent No.: US 8,164,289 B2
(45) Date of Patent: Apr. 24, 2012

(54) BRUSHLESS MOTOR AND CONTROL METHOD OF BRUSHLESS MOTOR

(75) Inventor: Masayuki Okubo, Kiryu (JP)

(73) Assignee: MITSUBA Corporation, Gunma (JP)

( * ) Notice: Subject to any disclaimer, the term of this patent is extended or adjusted under 35 U.S.C. 154(b) by 465 days.

(21) Appl. No.: 12/311,338

(22) PCT Filed: Oct. 12, 2007

(86) PCT No.: PCT/JP2007/069920
§ 371 (c)(1),
(2), (4) Date: Mar. 26, 2009

(87) PCT Pub. No.: WO2008/047698
PCT Pub. Date: Apr. 24, 2008

(65) Prior Publication Data
US 2010/0019708 A1    Jan. 28, 2010

(30) Foreign Application Priority Data

Oct. 16, 2006 (JP) .................. 2006-281289

(51) Int. Cl.
*H02P 1/04* (2006.01)
(52) U.S. Cl. ............... 318/400.19; 318/400.23; 318/432
(58) Field of Classification Search ............ 318/400.19, 318/400.2, 400.23, 432, 254; 180/446
See application file for complete search history.

(56) References Cited

U.S. PATENT DOCUMENTS

| | | | |
|---|---|---|---|
| 5,616,994 A * | 4/1997 | Nagaoka et al. | 318/400.04 |
| 6,104,117 A | 8/2000 | Nakamura et al. | |
| 6,255,789 B1 * | 7/2001 | Ochi et al. | 318/400.2 |
| 6,639,379 B2 * | 10/2003 | Matsushita et al. | 318/727 |
| 6,922,027 B2 * | 7/2005 | Schwarz et al. | 318/400.01 |
| 7,161,323 B2 * | 1/2007 | Ajima et al. | 318/629 |
| 7,180,217 B2 * | 2/2007 | Nakayama et al. | 310/179 |
| 7,218,071 B1 * | 5/2007 | Welchko et al. | 318/434 |
| 7,355,312 B2 * | 4/2008 | Kataoka et al. | 310/156.43 |
| 7,474,067 B2 * | 1/2009 | Ueda et al. | 318/432 |
| 7,518,273 B2 * | 4/2009 | Kataoka et al. | 310/68 B |
| 7,746,023 B2 * | 6/2010 | Ajima et al. | 318/700 |

(Continued)

FOREIGN PATENT DOCUMENTS

JP        10-42531        2/1998

(Continued)

OTHER PUBLICATIONS

International Preliminary Report on Patentability issued Apr. 30, 2009 in the International (PCT) Application of which the present application is the U.S. National Stage.

(Continued)

*Primary Examiner* — Paul Ip
(74) *Attorney, Agent, or Firm* — Wenderoth, Lind & Ponack, L.L.P.

(57) ABSTRACT

In a brushless motor having a stator including armature windings for a plurality of phases, and a rotor including a permanent magnet and being rotatably disposed inside or outside of the stator, an inter-phase induced voltage waveform between two different phases in the armature windings is a trapezoidal waveform formed by superimposing a fifth-order component and a seventh-order component on a first-order fundamental wave. A content rate $X(=(\alpha_5+\alpha_7)/\alpha_1)$ of a total of voltage peak values $\alpha_5$ and $\alpha_7$ of the fifth-order component and the seventh-order component to a voltage peak value $\alpha_1$ of the first-order fundamental wave is preferably set to a range of $0.01 \leq X \leq 0.1$, and more preferably to a range of $0.02 \leq X \leq 0.09$.

10 Claims, 8 Drawing Sheets

U.S. PATENT DOCUMENTS

| | | | |
|---|---|---|---|
| 2003/0057913 A1* | 3/2003 | Matsushita et al. | 318/727 |
| 2006/0001392 A1* | 1/2006 | Ajima et al. | 318/432 |
| 2006/0028161 A1* | 2/2006 | Yamamoto et al. | 318/432 |
| 2006/0125334 A1* | 6/2006 | Kataoka et al. | 310/68 B |
| 2006/0192511 A1* | 8/2006 | Kataoka et al. | 318/254 |
| 2007/0007072 A1* | 1/2007 | Ta et al. | 180/446 |
| 2007/0052381 A1* | 3/2007 | Ueda et al. | 318/432 |
| 2008/0067960 A1* | 3/2008 | Maeda et al. | 318/400.02 |
| 2009/0128073 A1* | 5/2009 | Okubo et al. | 318/400.23 |
| 2009/0234538 A1* | 9/2009 | Ta et al. | 701/41 |

FOREIGN PATENT DOCUMENTS

| | | |
|---|---|---|
| JP | 2004-274963 | 9/2004 |
| JP | 2006-174692 | 6/2006 |

OTHER PUBLICATIONS

International Search Report issued Dec. 4, 2007 in the International (PCT) Application of which the present application is the U.S. National Stage.

* cited by examiner

[FIG. 1]
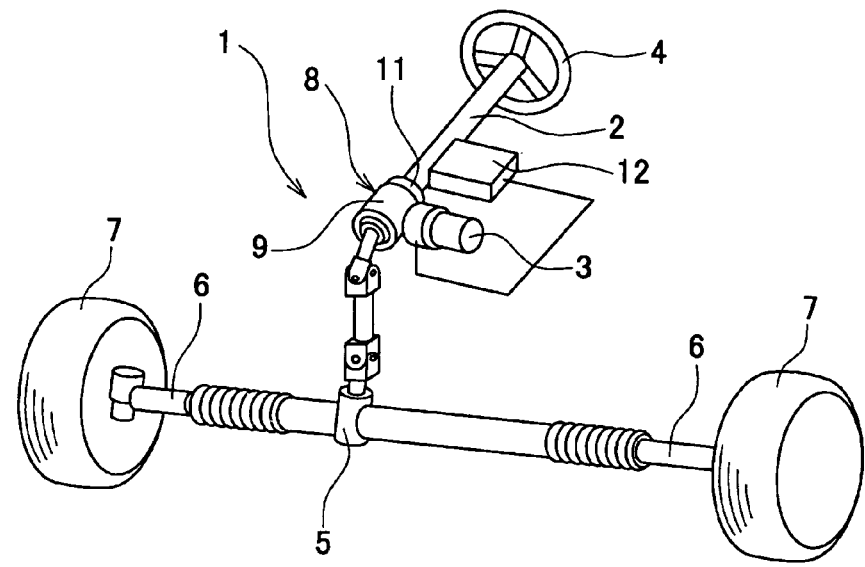
[FIG. 2]
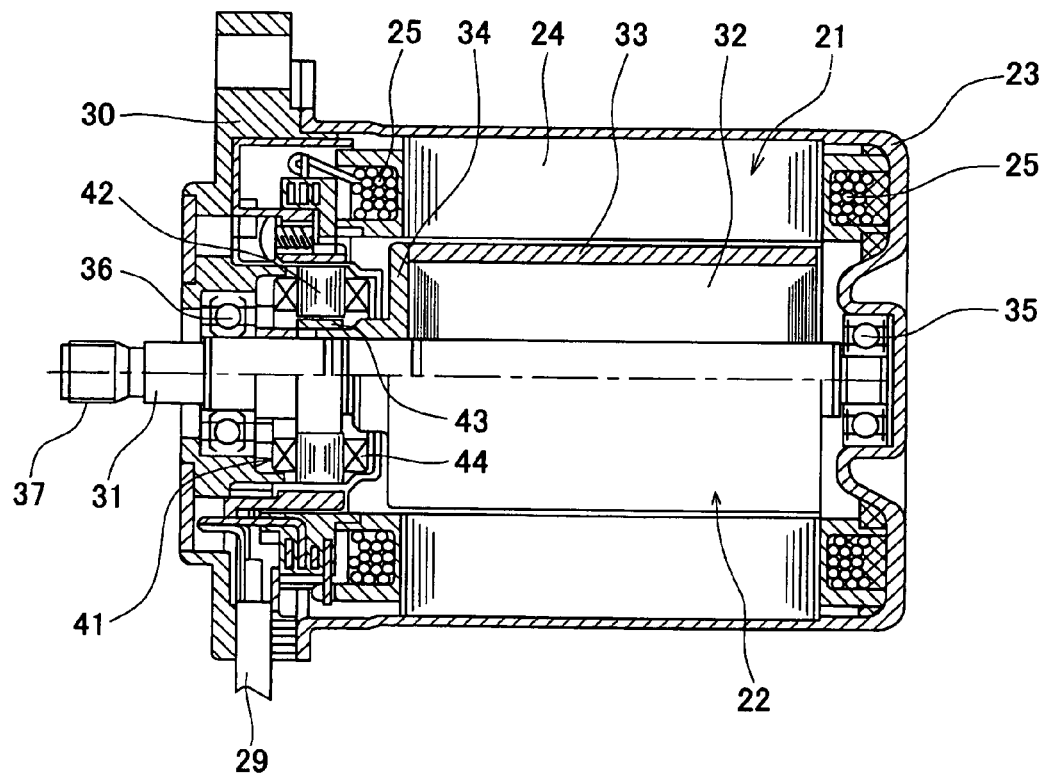

[FIG. 3]
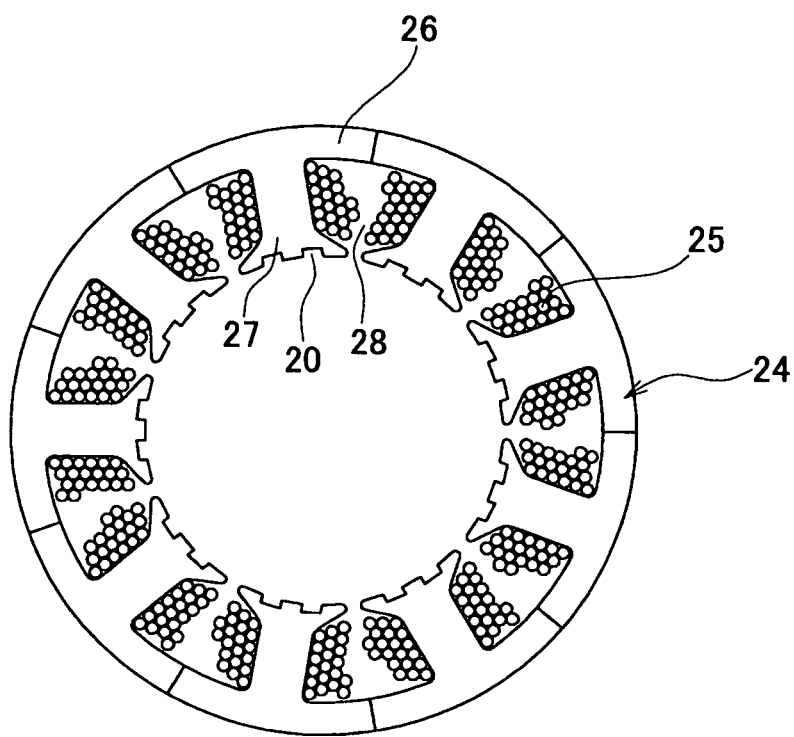
[FIG. 4]
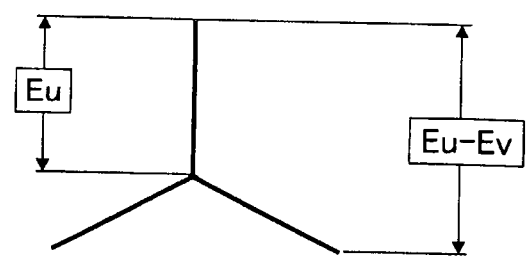

[FIG. 5]
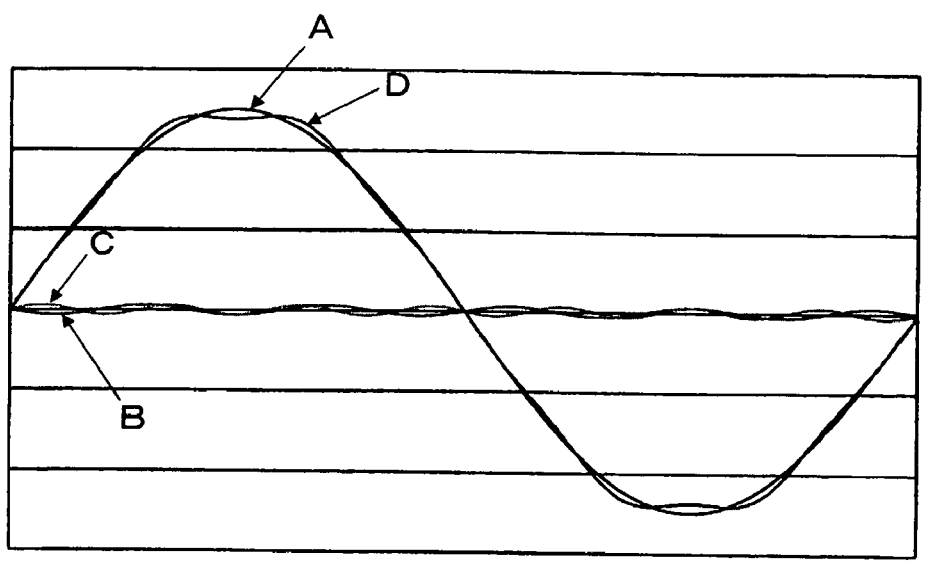
(a)
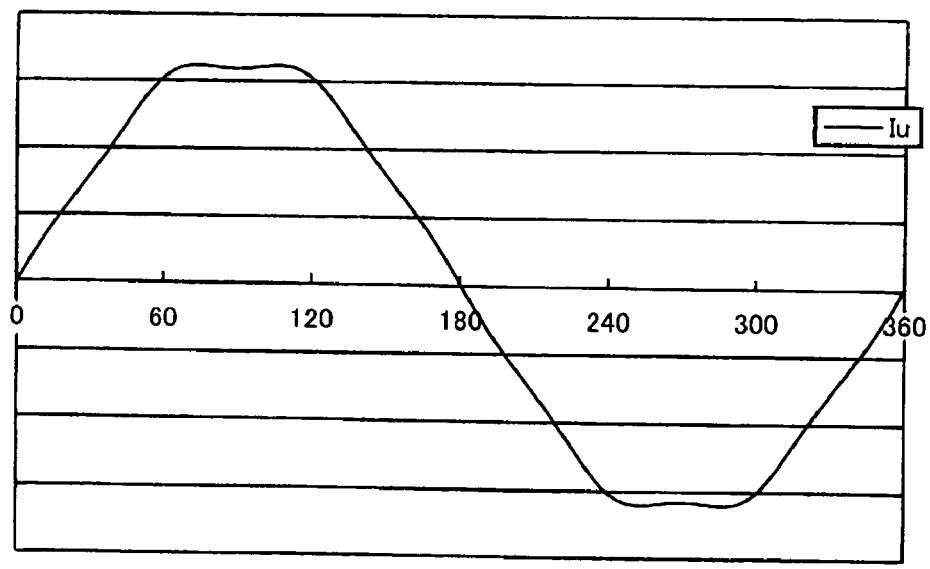
(b)

[FIG. 6]
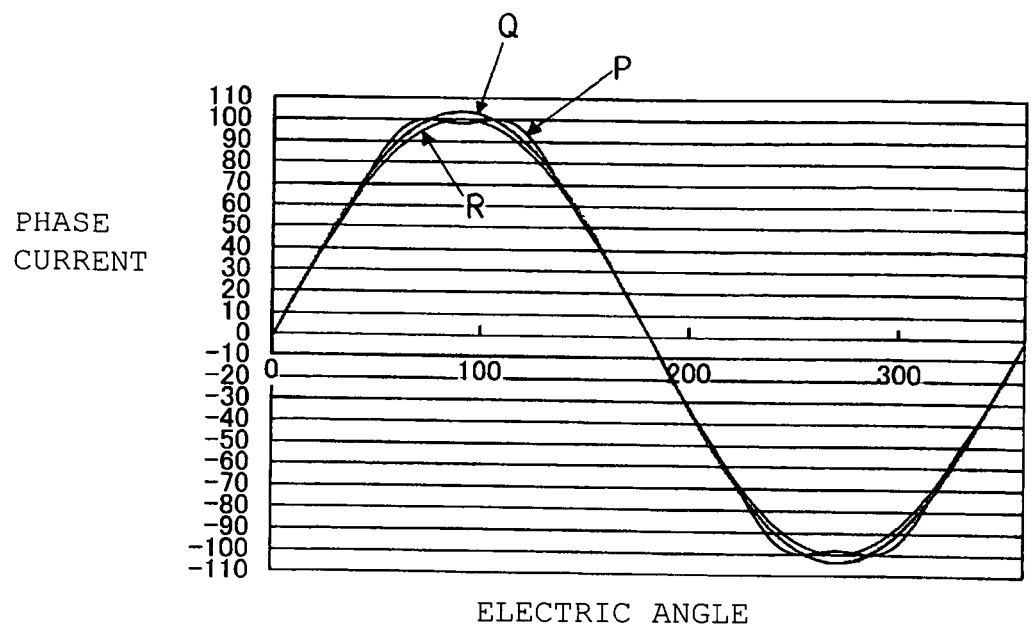
[FIG. 7]
| 100Apeak | TORQUE | PHASE CURRENT peak | FIRST-ORDER CURRENT peak |
|---|---|---|---|
| SINE WAVE PHASE CURRENT | 5.0Nm | 100A | 100A |
| TRAPEZOIDAL WAVE PHASE CURRENT | 5.2Nm | 100A | 103.6A |

[FIG. 8]
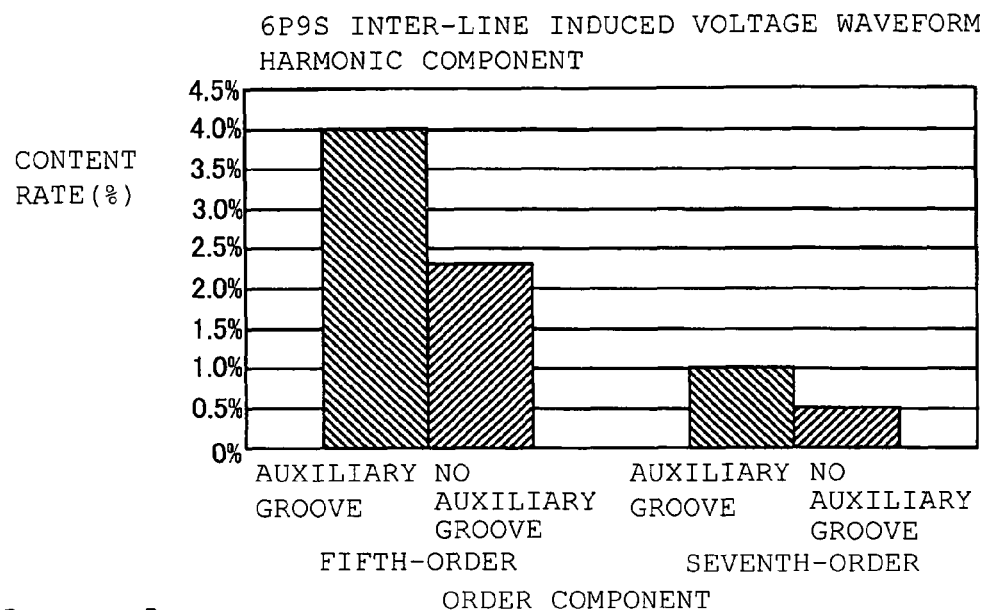
[FIG. 9]
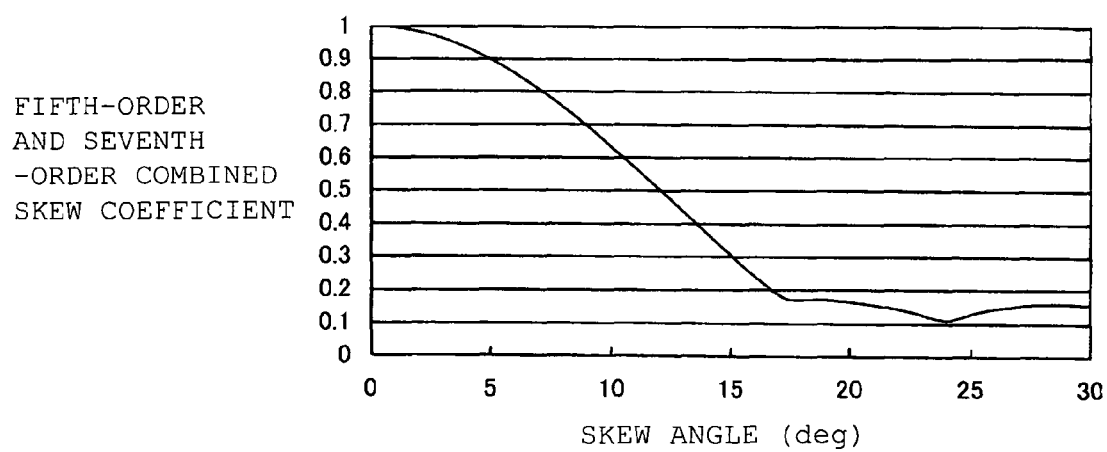

[FIG. 10]
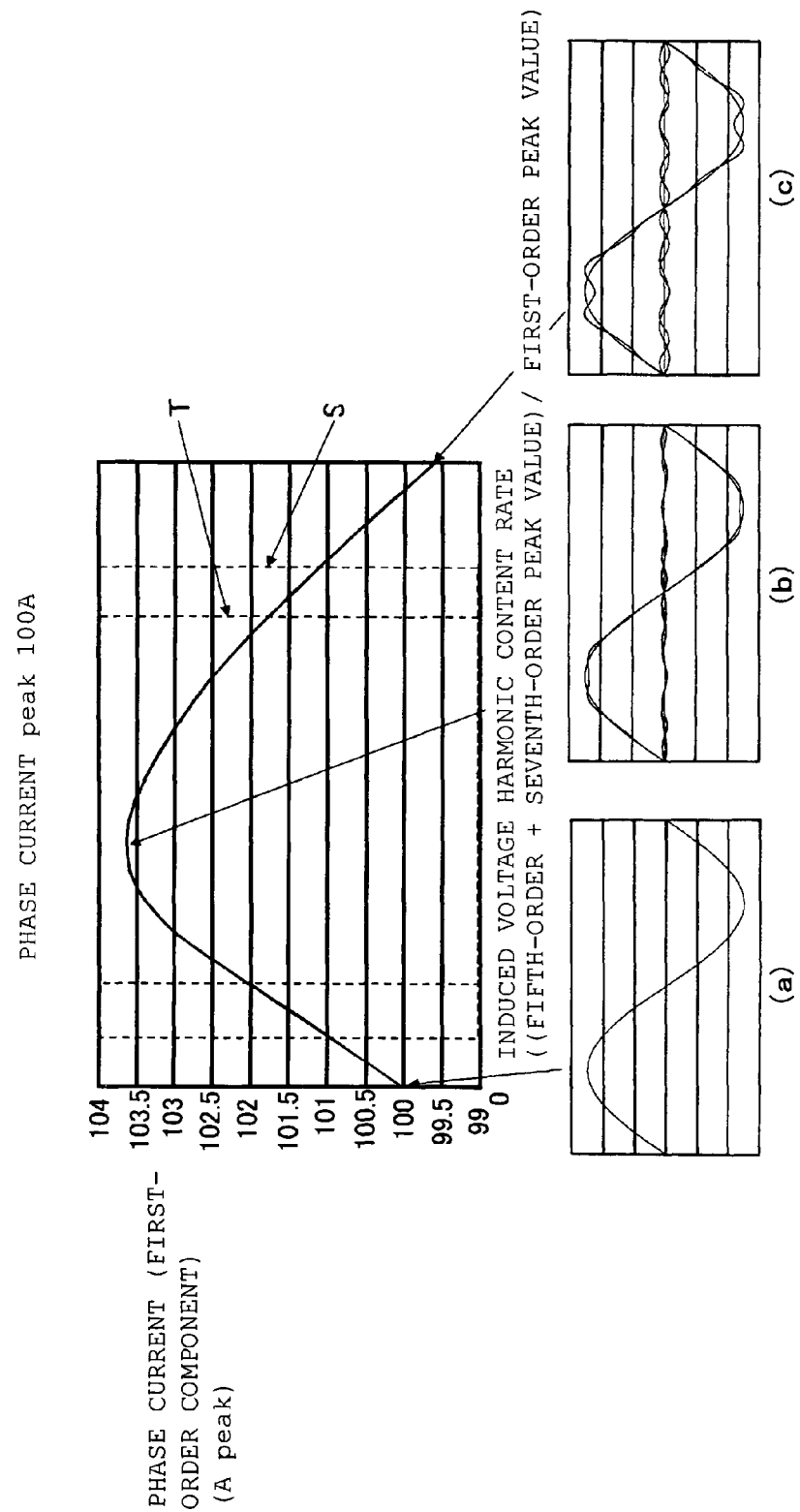

[FIG. 11]
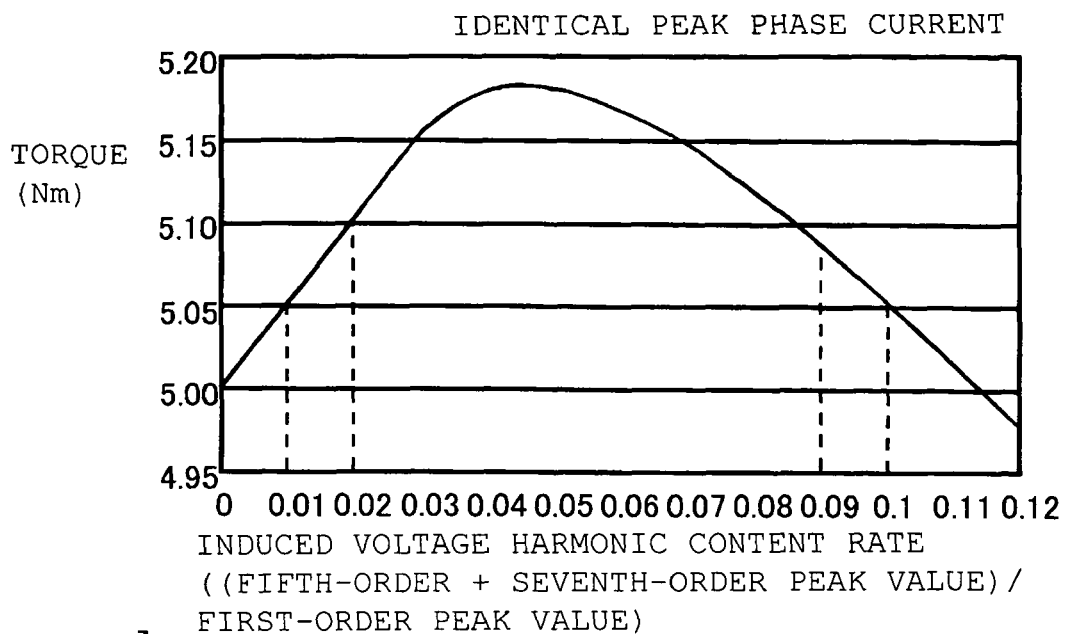
[FIG. 12]
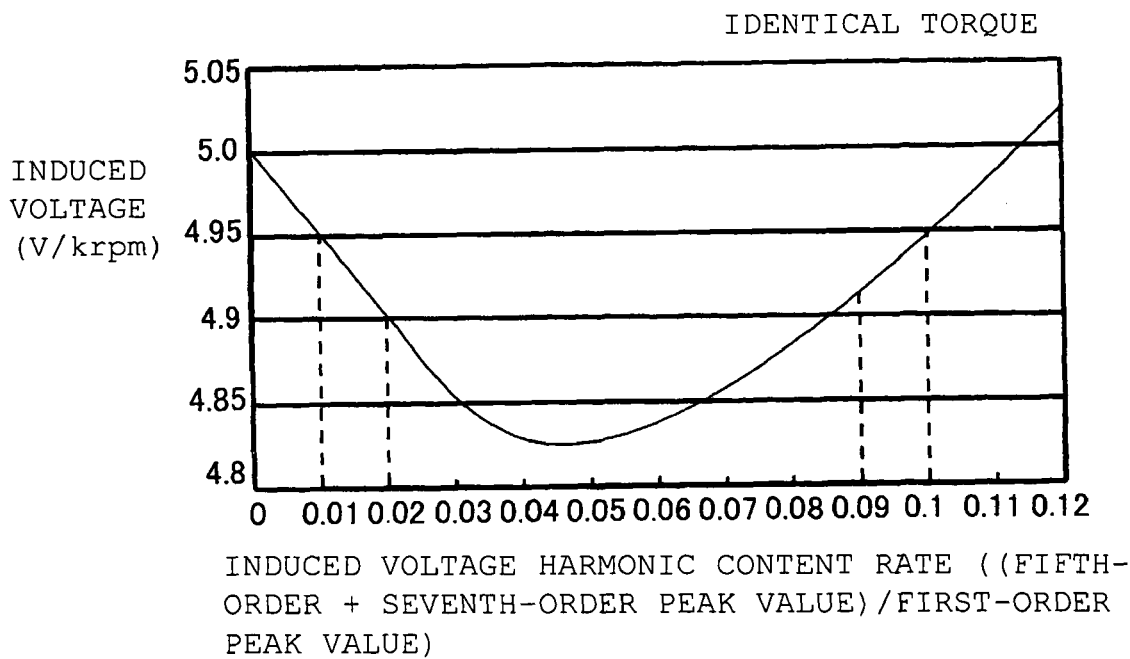

[FIG. 13]
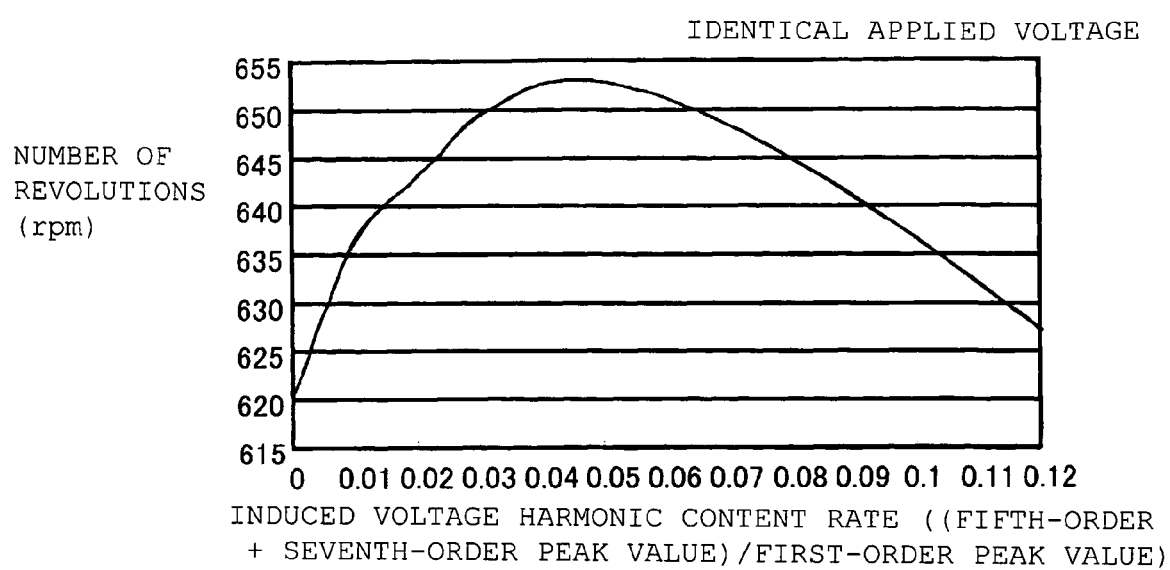

BRUSHLESS MOTOR AND CONTROL METHOD OF BRUSHLESS MOTOR

TECHNICAL FIELD

The present invention relates to a brushless motor and a method of controlling a brushless motor, and more particularly, to a technology that may be effectively applied to a brushless motor for an electric power steering device.

BACKGROUND ART

In order to assist a steering force of an automobile or the like, in recent years, a large number of vehicles are provided with so-called power steering devices. As the power steering devices of this type, recently, the number of vehicles to which electric type power steering devices (so-called electric power steering device, hereinafter appropriately abbreviated as "EPS") are mounted are increasing from a viewpoint of a reduction in engine load, a reduction in weight, or the like. As a power source of the EPS as described above, motors with brushes have been frequently used hitherto. In recent years, however, the brushless motors have been increasingly used because the brushless motors are excellent in maintenance property, have small size, and are capable of generating high torque.

In such ESP motor as described above, attention is focused on an operation noise reduction for improvement of driver's operation feeling. In general, the torque variation (torque ripple) and the operation noise are closely related with each other, and torque ripple reductions realized by designing an energizing method have been variously studied for the EPS motor, particularly, the brushless motor. For example, it is well known that a sine wave drive that enables smooth energization is conducted instead of a square wave drive as a measure against the operation noise. However, in the case of the sine wave drive, an induced voltage waveform on the motor side needs to be converted into a sine wave configuration in order to reduce the torque ripple. For that reason, in the sine wave drive motor, the induced voltage waveform is converted into the sine wave waveform by skew or eccentricity of a magnet.

However, when the rotor is subjected to skew, a first-order component of the induced voltage is also reduced. For that reason, in the conventional sine wave drive motor, an output of the motor must be somewhat sacrificed under the circumstances. Therefore, in order to improve a reduction in motor output as described above, there has been developed a technique in which a harmonic is included in the induced voltage, and a current that cancels the harmonic is allowed to flow, thereby reducing a skew angle to reduce an output loss. Further, for example, Patent Document 1 proposes a technique in which the induced voltage of each phase is adjusted to a trapezoidal wave on which an odd-order harmonic is superimposed to improve the torque while suppressing a torque ripple. In the technique, induced voltage adjusting means superimposes a third-order harmonic on the induced voltage of a sine wave configuration being a fundamental wave to adjust the induced voltage of each phase into a substantially trapezoidal waveform configuration flatly spread without a rapid change. As a result, a configuration of a portion surrounded by a characteristic curve of each phase induced voltage with respect to a rotor rotation angle and an abscissa axis (rotation angle) is formed into a configuration more flatly spread than that in the case of the characteristic curve of only a fundamental wave, and motor generation torque is increased by that amount.

Patent Document 1: JP 2006-174692 A
Patent Document 2: JP 2004-274693 A

However, when the harmonic is superimposed on the induced voltage, and the induced voltage of each phase is formed into the trapezoidal waveform as described above, it is difficult to suppress a peak current value because the phase current of each phase is formed into the sine waveform. For that reason, there arises such a problem that a current value that can be made to flow in the brushless motor is restricted, and the motor output is suppressed by that amount.

An object of the present invention is to provide a brushless motor and a method of controlling a brushless motor capable of realizing higher torque and higher rotation compared with the drive system in which the induced voltage of each phase is formed into the trapezoidal waveform, while suppressing the peak current value.

SUMMARY OF THE INVENTION

A brushless motor according to the present invention has a stator including armature windings for a plurality of phases, and a rotor including a permanent magnet and being rotatably disposed inside or outside of the stator. The motor is characterized in that an inter-phase induced voltage waveform between two different phases in the armature windings is substantially trapezoidal.

In the brushless motor according to the present invention, the inter-phase induced voltage waveform is substantially formed into a trapezoid, whereby a phase current is also formed into a trapezoidal waveform. Accordingly, a current peak value of a first-order component which contributes to motor torque becomes larger than a sine waveform phase current having the same phase current peak value. For that reason, the motor torque is increased more compared with a motor in which the induced voltage of each phase is formed into the trapezoidal waveform and its phase current becomes a sine waveform, thereby improving an output.

In the above brushless motor, the inter-phase induced voltage waveform may be formed by superimposing an odd higher-order component except for a higher-order component of multiples of 3 on a first-order fundamental wave. Also, the inter-phase induced voltage waveform may be formed by superimposing a fifth-order component and a seventh-order component on the first-order fundamental wave. In that case, a content rate $X(=(\alpha_5+\alpha_7)/\alpha_1)$ of a total of voltage peak values $\alpha_5$ and $\alpha_7$ of the fifth-order component and the seventh-order component to a voltage peak value $60_1$ of the first-order fundamental wave may be preferably set to a range of $0.01 \leq X \leq 0.1$, and more preferably to a range of $0.02 \leq X \leq 0.09$. By setting the content rate X to the above ranges, it is possible to increase the first-order component current peak value while suppressing the phase current peak value. Also, it is possible to increase the number of revolutions of the motor while suppressing the peak current to the same level as in the case of the sine wave phase current.

Meanwhile, a method of controlling a brushless motor according to the present invention is a method of controlling a brushless motor having a stator including armature windings for a plurality of phases, and a rotor including a permanent magnet and being rotatably disposed inside or outside of the stator, characterized in that an inter-phase induced voltage waveform between two different phases in the armature windings is substantially trapezoidal.

In the method of controlling a brushless motor according to the present invention, a waveform of the inter-phase induced voltage is substantially formed into a trapezoid, whereby the phase current is also formed into a trapezoidal waveform.

Accordingly, the current peak value of the first-order component which contributes to the motor torque becomes larger than the sine waveform phase current having the same phase current peak value. For that reason, the motor torque is increased more compared with the motor which the induced voltage of each phase is formed into the trapezoidal waveform and its phase current becomes the sine waveform, thereby improving the output.

The above-mentioned method of controlling a brushless motor according to the present invention may include superimposing the odd higher-order component except for a higher-order component of multiples of 3 on a first-order fundamental wave of the inter-phase induced voltage waveform. In this case, a fifth-order component and a seventh-order component may be superimposed on the first-order fundamental wave of the inter-phase induced voltage waveform. Further, a content rate $X(=(\alpha 5+\alpha 7)/\alpha 1)$ of a total of voltage peak values $\alpha 5$ and $\alpha 7$ of the fifth-order component and the seventh-order component to a voltage peak value $\alpha 1$ of the first-order fundamental wave may be preferably set to a range of $0.01 \leq X \leq 0.1$, and more preferably to a range of $0.02 \leq X \leq 0.09$.

EFFECTS OF THE INVENTION

According to the brushless motor of the present invention, in the brushless motor having the stator including the armature windings for the plurality of phases, and the rotor including the permanent magnet and being rotatably disposed inside or outside the stator, the inter-phase induced voltage waveform between the two different phases in the armature winding is substantially trapezoidal. Hence, the phase current of the armature winding can be formed into the trapezoidal waveform. For that reason, the current peak value of the first-order component which contributes to the motor torque can be increased as compared with a sine wave phase current having the same phase current peak value, thereby making it possible to increase the motor torque more, and improve the motor output.

According to the method of controlling the brushless motor of the present invention, the brushless motor has the stator including the armature windings for the plurality of phases, and the rotor including the permanent magnet and being rotatably disposed inside or outside the stator, the inter-phase induced voltage waveform between the two different phases in the armature winding is substantially trapezoidal. Hence, the phase current of the armature winding can be formed into the trapezoidal waveform. For that reason, a current peak value of a first-order component which contributes to the motor torque can be increased as compared with a sine wave phase current having the same phase current peak value, thereby making it possible to increase the motor torque more, and improve the motor output.

BRIEF DESCRIPTION OF THE DRAWINGS

[FIG. 1] A cross-sectional view illustrating a configuration of an electric power steering device using a brushless motor according to the present invention.

[FIG. 2] A cross-sectional view illustrating a configuration of the brushless motor used in the electric power steering device of FIG. 1.

[FIG. 3] An explanatory diagram illustrating a configuration of a stator core of the brushless motor of FIG. 2.

[FIG. 4] An explanatory diagram illustrating a connection state of the brushless motor of FIG. 2.

[FIG. 5] (a) illustrates scheme of an inter-phase induced voltage of the brushless motor according to the present invention, and (b) is an explanatory diagram illustrating a phase current in the case of FIG. 5(a).

[FIG. 6] An explanatory diagram illustrating waveforms of a sine wave phase current and a trapezoidal wave phase current (superimposing fifth-order and seventh-order components).

[FIG. 7] A table illustrating motor torque, peak values of the phase current, and peak values of a first-order component current in the sine wave phase current and the trapezoidal wave phase current (superimposing fifth-order and seventh-order components).

[FIG. 8] A graph illustrating a content rate of the fifth-order and seventh-order harmonic components in accordance with presence or absence of an auxiliary groove.

[FIG. 9] A graph illustrating a relationship between a skew angle and a combined skew coefficient of the fifth order and the seventh order in a motor of 6P9S.

graphs illustrating a relationship between $_1$) and the first-order component current peak value.

[FIG. 10] Graphs illustrating a relationship between a content rate X $(=(\alpha_5+\alpha_7)/\alpha_1)$ of a total of voltage peak values $\alpha_5$ and $\alpha_7$ of fifth-order and seventh-order harmonic components with respect to a voltage peak value $\alpha_1$ of the first-order fundamental wave, and the first-order component current peak value when the phase current peak value is set to 100 A.

[FIG. 11] A graph illustrating a relationship between X and torque when the phase current peak value is identical.

[FIG. 12] A graph illustrating a crest value of an induced voltage waveform with respect to the same torque.

[FIG. 13] A graph illustrating a relationship between X and the number of revolutions of a motor when an applied voltage is identical.

Description of the Reference Symbols
   1 electric power steering device
   2 steering shaft
   3 motor
   4 steering wheel
   5 steering gear box
   6 tie rod
   7 wheel
   8 assist motor portion
   9 reduction mechanism portion
   11 torque sensor
   12 control unit
   20 auxiliary groove
   21 stator
   22 rotor
   23 housing
   24 stator core
   25 winding wire
   26 yoke
   27 teeth
   28 slot
   29 feed wiring
   30 bracket
   31 rotating shaft
   32 rotor core
   33 magnet
   34 magnet holder
   35 bearing
   36 bearing
   37 spline portion
   41 resolver
   42 resolver stator 43 resolver rotor
44 coil
A first-order fundamental wave
B fifth-order harmonic
C seventh-order harmonic
D superimposed wave
Eu single-phase induced voltage (U phase)
Euv inter-phase induced voltage (U-V phase)
Ev induced voltage
Ke induced voltage constant

DETAILED DESCRIPTION OF THE INVENTION

Hereinafter, a description is given of an embodiment of the present invention with reference to the drawings. FIG. 1 is a cross-sectional view illustrating a configuration of an electric power steering device using a brushless motor according to the present invention. An electric power steering device (EPS) 1 of FIG. 1 is configured by a column assist type in which an operating assist force is supplied to a steering shaft 2. In the EPS 1, a motor 3 to which the control method according to the present invention is applied is used as a power source.

A steering wheel 4 is fixed to the steering shaft 2. A steering force of the steering wheel 4 is transmitted to tie rods 6 through a pinion (not shown) and a rack shaft (not shown) which are arranged within a steering gear box 5. Wheels 7 are connected to both ends of the tie rods 6. When the tie rods 6 operate with the operation of the steering wheels 4, the wheels 7 are steered right and left through knuckle arms (not shown) or the like.

In the EPS 1, an assist motor portion 8 that is a steering force assist mechanism is provided to the steering shaft 2. The assist motor portion 8 includes a reduction mechanism portion 9 and a torque sensor 11 together with the motor 3. In the reduction mechanism portion 9, a worm (not shown) and a worm wheel (not shown) are provided. The rotation of the motor 3 is reduced in speed and transmitted to the steering shaft 2 by means of the reduction mechanism portion 9. The motor 3 and the torque sensor 11 are connected to a control unit (ECU) 12.

When the steering wheel 4 is operated to rotate the steering shaft 2, the torque sensor 11 is operated. The ECU 12 appropriately supplies electric power to the motor 3 on the basis of the detected torque of the torque sensor 11. When the motor 3 is operated, the rotation of the motor 3 is transmitted to the steering shaft 2 through the reduction mechanism portion 9, and the steering assist force is supplied to the steering shaft 2. The steering shaft 2 rotates due to the steering assist force and a manual steering force. The rotary motion is converted into a linear motion of the rack shaft by rack and pinion coupling within the steering gear box 5 to conduct the steering operation of the wheels 7.

FIG. 2 is a cross-sectional view illustrating a configuration of the motor 3. As llustrated in FIG. 2, the motor 3 is of an inner rotor type brushless motor in which a stator 21 is arranged outside and a rotor 22 is arranged inside. The stator 21 is configured so as to include a housing 23, a stator core 24 that is fixed to an inner peripheral side of the housing 23, and a winding wire 25 that is winded on the stator core 24. The housing 23 is formed in a bottomed cylindrical shape made of iron or the like. A bracket 30 that is made of a synthetic resin is fixed to an opening of the housing 23. The stator core 24 is formed by laminating a large number of steel plates on each other. A plurality of teeth are projected on the inner peripheral side of the stator core 24.

FIG. 3 is an explanatory diagram illustrating a configuration of the stator core 24. The stator core 24 includes a ring-shaped yoke 26 and teeth 27 that project inward from the yoke 26. The number of teeth 27 is nine. Slots 28 (nine pieces) are defined between the respective teeth 27, and the motor 3 is configured by nine slots. Auxiliary grooves 20 are formed at a leading end of the teeth 27. A winding wire 25 is wound around each of the teeth 27 by concentrated winding. The winding wires 25 are housed within each of the slots 28. The winding wires 25 are connected to a battery (not shown) through a feed wiring 29. A phase current (U, V, W) of a trapezoidal wave form containing harmonic components therein is supplied to the winding wires 25.

The rotor 22 is disposed inside the stator 21, and configured in such a manner that a rotating shaft 31, a rotor core 32, and magnets 33 are arranged coaxially. The cylindrical rotor core 32 obtained by laminating a large number of steel plates on each other is fixed to an outer periphery of the rotating shaft 31. The magnets 33 of the segment type are disposed on an outer periphery of the rotor core 32. The magnets 33 are fitted to a magnet holder 34 that is fixed to the rotating shaft 31. The six magnets 33 are arranged along a peripheral direction. That is, the motor 3 is configured by six poles and nine slots.

One end of the rotating shaft 31 is rotatably supported by bearings 35 that are press-fitted into the bottom of the housing 23. Another end of the rotating shaft 31 is rotatably supported by bearings 36 that are fitted to the bracket 30. A spline portion 37 is formed on the end of the rotating shaft 31 (left end of FIG. 2). The rotating shaft 31 is connected to a worm shaft of the reduction mechanism portion 9 by a joint member (not shown) that is fitted to the spline portion 37. A worm is formed on the worm shaft. The worm is meshed with the worm wheel that is fixed to the steering shaft 2 by the reduction mechanism portion 9.

The bearings 36 and a resolver 41 that detects the rotation of the rotor 22 are housed within the bracket 30. The resolver 41 includes a resolver stator 42 that is fixed to the bracket 30 side, and a resolver rotor 43 that is fixed to the rotor 22 side. A coil 44 is wound around the resolver stator 42 and includes an excitation coil and a detection coil. The resolver rotor 43 that is fixed to the left end of the magnetic holder 34 is disposed inside the resolver stator 42. The resolver rotor 43 is configured by laminating metal plates on each other, and has projections formed in three directions.

When the rotating shaft 31 rotates, the resolver rotor 43 also rotates within the resolver stator 42. A high frequency signal is supplied to the excitation coil of the resolver stator 42 to change a phase of a signal that is output from the detection coil in response to proximity distance from the projections. The detection signal and a reference signal are compared with each other to detect a rotational position of the rotor 22. Then, a current supplied to the winding wires 25 is appropriately changed over on the basis of the rotational position of the rotor 22 to rotationally drive the rotor 22.

In the EPS 1 as described above, when the steering wheel 4 is operated to rotate the steering shaft 2, the rack shaft is moved in a direction corresponding to the rotation to conduct the steering operation. The torque sensor 11 is operated by the above-mentioned operation, and electric power is supplied to the winding wires 25 from a battery (not shown) through the feed wiring 29 according to the detected torque. When the electric power is supplied to the winding wires 25, the motor 3 is operated to rotate the rotational shaft 31 and the worm shaft. The rotation of the worm shaft is transmitted to the steering shaft 2 through the worm wheel to assist the steering force.

In actuation of the EPS 1, in order to further improve the motor output while suppressing the torque fluctuation, adjustment is made in the motor 3 so that an induced voltage waveform between phases is formed into a trapezoidal wave. FIG. 4 is an explanatory diagram illustrating a connection state of the motor 3, FIG. 5(*a*) is an explanatory diagram illustrating a scheme of an inter-phase induced voltage of the motor 3 according to the present invention, and FIG. 5(*b*) is an explanatory diagram illustrating a phase current in the case of FIG. 5(*a*). As illustrated in FIG. 4, the motor 3 is of a star connection of three phases, and the inter-phase induced voltage indicates a potential difference between two different phases of the winding wires 25. For example, in the case of an inter-phase induced voltage Euv, a difference Eu-Ev between a single-phase induced voltage Eu of a U-phase winding, and a single-phase induced voltage Ev of a V-phase winding becomes an inter-phase induced voltage Euv. Note that what is adjusted into a trapezoidal wave in Patent document 1 is a single phase induced voltage (for example, Eu in this case) of each phase.

In the motor 3, the inter-phase induced voltage as described above is formed into a trapezoidal waveform in which fifth-order and seventh-order harmonics are superimposed on the first-order fundamental wave. As illustrated in FIG. 5, when a fifth-order harmonic B and a seventh-order harmonic C are superimposed on the first-order fundamental wave A of the sine waveform, a superimposed wave substantially formed as a trapezoid is formed as indicated by D in the figure. When the inter-phase induced voltage is thus adjusted to the trapezoidal wave, the phase current is also formed into a trapezoidal waveform as illustrated in FIG. 5(*b*). FIG. 6 is an explanatory diagram illustrating waveforms of a sine wave phase current and a trapezoidal wave phase current (superimposing fifth-order and seventh-order components). FIG. 7 is a table illustrating motor torque, peak values of the phase current, and peak values of the first-order component current in both of those currents. According to the inventors' experiments, in the trapezoidal wave phase current, as illustrated in the table of FIG. 7, the torque is larger by 0.2 Nm (4% greater than the sine wave phase current) even when the phase current peak value is the same value, 100 A.

Here, what contributes to the torque among the phase current is a first-order component of the sine waveform, and in the sine wave phase current, both of the phase current peak value and the first-order component current peak value become 100 A. On the contrary, the trapezoidal wave phase current is formed so that the fifth-order and seventh-order components are superimposed on the first-order component of the sine waveform. In this case, the phase current peak value is suppressed to 100 A by using the first-order component which has a peak value of 103.6 A. That is, in the trapezoidal waveform (P of FIG. 6) on which the fifth-order and seventh-order components are superimposed, the current waveform becomes the form of Mt. Fuji (cross-sectional configuration of a konide volcano (stratovolcano) with a substantially circular truncated cone), and the peak value of the entire phase current is lowered. However, in the trapezoidal wave on which the fifth-order and seventh-order components are superimposed, a first-order component (Q of FIG. 6) having a higher peak value is hidden, which contributes to the torque generation. For that reason, the first-order component current peak value can be increased (to 103.6 A from 100 A) more than the sine wave phase current (R of FIG. 6) having the same phase current peak value (100 A in this case), thereby making it possible to increase the motor torque and improve the output.

Note that the component of the harmonic component of the induced voltage to be contained is fundamentally determined according to the combination of a pole and a slot. For example, in the case of a concentrated winding, the order component to be contained can be readily calculated according to the short pitch winding coefficient Kp (the following expression) being one winding coefficient.

$$Kp=|\cos(n \cdot (1-P) \cdot \pi/2)| \quad (n: \text{order}, P: \text{winding pitch/pole pitch})$$

In the motor 3, in order to adjust the inter-phase induced voltage to the trapezoidal wave, the winding wire 25 is configured by the concentrated winding, and the star connection is applied. Then, the number of magnetic poles P of the rotor 22 and the number of slots S of the stator 21 are set to the integral multiple (6P9S) of 2P3S.

In the present invention, in order to readily take in the fifth-order harmonic and the seventh-order harmonic, an auxiliary groove 20 is defined at a leading end of a teeth 27 in 6P9S. The provision of the auxiliary groove 20 enables the fifth-order and seventh-order harmonics to be largely included in the inter-phase induced voltage. In the case of the auxiliary groove formation, it is unnecessary to change the winding pitch, and thus the winding work is easy. FIG. 8 is a graph illustrating the content rate of the fifth-order and seventh-order harmonic components in the case of the presence and absence of the auxiliary groove. As illustrated in FIG. 8, the provision of the auxiliary groove improves the content rate of the fifth-order and seventh-order harmonic components by about 50%, thereby making it possible to obtain the fifth-order and seventh-order harmonic components with high efficiency.

A reduction in the fifth-order and seventh-order harmonic components depends on the skew angle, which is obtained from the skew coefficient being one of the winding coefficient. In this case, a skew coefficient ksv with respect to a υ-th-order harmonic component is represented by the following expression.

$$\text{ksv} = \sin(\upsilon \gamma/2)/(\upsilon \gamma/2) \quad (\gamma: \text{skew angle})$$

With the use of the skew coefficient ksv, the content of the fifth-order and seventh-order harmonic components can be represented by the following expression.

$$\text{Harmonic content} = K \times \text{ksv} \times \beta$$

(K: correction coefficient)

(β: content of the harmonic component which is adjusted by the auxiliary groove 20 in a state where there is no skew)

Note that the actual harmonic content when the harmonic component is included by the auxiliary groove and the skew is not obtained by only multiplying ksv by β (ksv×β is a theoretical value), and hence the correction coefficient K is used for calculation of an X value. The value of the correction coefficient K represents a relationship between the theoretical value and the real harmonic content, and is obtained by experiments.

FIG. 9 is a graph illustrating a relationship between a skew angle and a combined skew coefficient of the fifth order and the seventh order in a motor of 6P9S. In the case of 6P9S, the lowest common multiple of the pole and the slot is 18, and when the skew angle is larger than 20°, the combined order of the fifth-order and the seventh-order is reduced, whereby the effect of the skew is lowered. Accordingly, in order to effectively adjust the fifth-order and seventh-order harmonic components, it is preferable that the skew angle be set in a range of 0<skew angle≦360°/the lowest common multiple of the number of poles and the slot.

On the other hand, a relational expression satisfying that the inter-phase induced voltage waveform is trapezoidal can be represented by the following expression, and the coefficients $\alpha_1, \alpha_3, \alpha_5, \alpha_7 \ldots$ of the expression are appropriately changed, thereby making it possible to change the waveform of the superimposed wave.

$$E=A(\alpha_1 \sin \theta + \alpha_3 \sin 3\theta + \alpha_5 \sin 5(\theta+180) + \alpha_7 \sin 7\theta + \ldots)$$

In this case, the respective coefficients $\alpha_1, \alpha_3, \alpha_5, \alpha_7 \ldots$ represent voltage peak values at the respective orders. FIG. 10 are graphs illustrating a relationship between a content rate $X(=(\alpha_5+\alpha_7)/\alpha_1)$ of a total of voltage peak values $\alpha_5$ and $\alpha_7$ of fifth-order and seventh-order harmonic components with respect to a voltage peak value a1 of the first-order fundamental wave, and the first-order component current peak value when the phase current peak value is set to 100 A.

Referring to FIG. 10, in the case of X=0, there is only the first-order fundamental wave, or the first-order+the third-order (when the harmonic having the multiple order of 3 is superimposed, a sine wave is obtained, but a trapezoidal wave is not obtained, and the same current peak value (100 A: (a) of FIG. 10) as that of the first-order fundamental wave is obtained). Further, in FIG. 10, in the case of X=0.12, irregularities of a top of the trapezoidal wave become large due to the fifth-order and the seventh-order, and the phase current peak value and the first-order component current peak value are identical with each other ((c) of FIG. 10). Still further, when X becomes a value equal to or higher than 0.12, the phase current peak value becomes higher than the first-order component current peak value, and it is impossible to increase the first-order component current peak value while suppressing the phase current peak value.

That is, extremely high or low content rate X of the fifth-order and seventh-order harmonics are not preferable because the first-order component current peak value becomes small. According to the inventors' experiment, it has been found that the first-order component current peak value becomes largest when the content rate X is close to 0.045, and the first-order component current peak value is largest as compared with a case where the inter-phase induced voltage waveform is a sine wave ((b) of FIG. 10). In addition, it has been found that when the content rate X is set to $0.01 \leq X \leq 0.1$ (frame S of FIG. 10), the first-order component current peak value increases about 1% or more, and when the content rate X is set to $0.02 \leq X \leq 0.09$ (frame T of FIG. 10), the phase current peak value increases about 2% or more. In view of those results, the content rate X is preferably set in a range of $0.01 \leq X \leq 0.1$, and more preferably set in a range of $0.02 \leq X \leq 0.09$. With the above-mentioned setting, it is possible to increase the first-order component current peak value by about 1% or more while suppressing the phase current peak value to the same degree as that of a case in which the inter-phase induced voltage waveform is a sine wave.

FIG. 11 is a graph illustrating a relationship between X and torque when the phase current peak value is identical. As illustrated in FIG. 11, even in this case, the torque becomes maximum when the content rate X is close to 0.045, and in the case of $0.01 \leq X \leq 0.1$, the torque increases by about 1% or more as compared with the case of X=0. Further, when setting is made so that $0.02 \leq X \leq 0.09$, the torque increases by about 2% or more as compared with the case of X=0. That is, the content rate X is preferably set in a range of $0.01 \leq X \leq 0.1$, and more preferably set in a range of $0.02 \leq X \leq 0.09$. As a result, it is possible to increase the motor torque by about 1% or more, or about 2% or more. Thus, it is possible to improve the output of the motor.

As described above, in the brushless motor according to the present invention, the inter-phase induced voltage waveform is formed into the trapezoidal wave, thereby making it possible to increase the first-order component current peak value as compared with the sine wave phase current having the same phase current peak value, thereby enabling the output improvement of the motor. Further, the content rate X of the fifth-order and seventh-order harmonics in the inter-phase induced voltage waveform is set to a given value, thereby making it possible to increase the first-order component current peak value, to obtain the high torque with the same peak current as that in the case of the sine wave phase current, and to improve the output of the motor by that amount. Accordingly, the motor output is improved as compared with a system (phase current in each phase becomes a sine waveform) in which the harmonic is superimposed on the induced voltage to form the induced voltage in each phase into the trapezoidal waveform, as described in Patent document 1.

Incidentally, the number of revolutions of the motor N of the motor can be represented by N=V/Ke (V: applied voltage, Ke: induced voltage constant (V/rpm), and it is found from the expression above that when the applied voltage is constant, the rotating speed is higher as Ke becomes smaller. FIG. 12 is a graph illustrating a crest value of an induced voltage waveform with respect to the same torque, in which the abscissa axis represents X described above, and the ordinate represents the induced voltage (V/krpm). In this case, Ke is the crest value of the induced voltage waveform, and similarly in this case, a correlation exists between X and Ke. That is, as illustrated in FIG. 12, extremely high or low content rate X of the fifth-order and seventh-order harmonics are not preferable because the induced voltage constant Ke becomes large. According to the inventors' experiment, similarly in this case, the induced voltage constant Ke becomes smallest when the content rate X is close to 0.045. Further, when the content rate X is set to $0.01 \leq X \leq 0.1$, the induced voltage constant Ke is reduced about 1% or more, and when the content rate X is set to $0.02 \leq X \leq 0.09$, the induced voltage constant Ke is reduced about 2% or more. Hence, from the viewpoint of the number of revolutions of the motor, the content rate X is preferably set in a range of $0.01 \leq X \leq 0.1$, and more preferably set in a range of $0.02 \leq X \leq 0.09$.

FIG. 13 is a graph illustrating a relationship between X and the motor r.p.m. when the applied voltage is identical. As illustrated in FIG. 13, even in this case, the r.p.m. becomes maximum when the content rate X is close to 0.045, and in the case of $0.01 \leq X \leq 0.1$, the r.p.m. increases by about 2.4% or more as compared with and the case of X=0. Further, when setting is made so that $0.02 \leq X \leq 0.09$, the r.p.m. increases by about 3.5% or more as compared with the case of X=0. That is, the content rate X is preferably set in a range of $0.01 \leq X \leq 0.1$, and more preferably set in a range of $0.02 \leq X \leq 0.09$. As a result, it is possible to increase the number of revolutions of the motor by about 2.4% or more, or about 3.5% or more. Accordingly, it is possible to increase the number of revolutions of the motor while suppressing the peak value to the same degree as that in the case of the sine wave phase current.

The present invention is not limited to the above-mentioned embodiment, but may be variously modified without departing from the scope of the invention.

For example, in the above-mentioned embodiment, the inter-phase induced voltage is adjusted to the trapezoidal wave due to the configuration of the concentrated winding star connection and the integral multiple of 2P3S, the angle adjustment of the stator skew or the rotor skew, the auxiliary groove, or the like. Alternatively, the content of the fifth-order and seventh-order components is adjusted by appropriately changing the configuration of the magnet 33, thereby making it possible to form the inter-phase induced voltage into the trapezoidal wave. In actuality, it is preferable that the inter-phase induced voltage be adjusted to the ideal trapezoidal wave by appropriate combination of those various conditions.

In addition, in the above-mentioned embodiment, the motor of six poles and nine slots is exemplified as the motor 3. However, the motor configuration is not limited thereto, and the present invention is also applicable to the motor of the integral multiple of two poles and three slots. Further, in the above-mentioned embodiment, the inner rotor type brushless motor is exemplified. However, the present invention may also be applied to the outer rotor type brushless motor in which the rotor is arranged outside the stator. In addition, in the above-mentioned embodiment, the control method according to the present invention is applied to the motor of the column assist type EPS. Alternatively, the control method according to the present invention may also be applied to the EPS motor of the rack assist type in which the motor is arranged coaxially with the rack shaft, or the EPS motor of the pinion assist type in which the assist force is supplied to the pinion gear that is meshed with the rack shaft.

The invention claimed is:

1. A brushless motor comprising:
    a stator including teeth and armature windings for a plurality of phases; and
    a rotor including a permanent magnet and being rotatably disposed inside or outside of said stator;
    wherein a configuration of said teeth of said stator, a configuration of said windings of said stator, and a number of poles of said rotor are set such that an inter-phase induced voltage waveform between two different phases in the armature windings is substantially trapezoidal.

2. A brushless motor according to claim 1, wherein the configuration of said teeth of said stator, the configuration of said windings of said stator, and the number of said poles of said rotor are set such that the inter-phase induced voltage waveform is formed by superimposing an odd higher-order component except for a higher-order component of multiples of 3 on a first-order fundamental wave.

3. A brushless motor according to claim 2, wherein the configuration of said teeth of said stator, the configuration of said windings of said stator, and the number of said poles of said rotor are set such that the inter-phase induced voltage waveform is formed by superimposing a fifth-order component and a seventh-order component on the first-order fundamental wave.

4. A brushless motor according to claim 3, wherein the configuration of said teeth of said stator, the configuration of said windings of said stator, and the number of said poles of said rotor are set such that a content rate $X(=(\alpha_5+\alpha_7)/\alpha_1)$ of a total of voltage peak values $\alpha_5$ and $\alpha_7$ of the fifth-order component and the seventh-order component to a voltage peak value $\alpha_1$ of the first-order fundamental wave is in a range of $0.01 \leq X \leq 0.1$.

5. A brushless motor according to claim 3, wherein the configuration of said teeth of said stator, the configuration of said windings of said stator, and the number of said poles of said rotor are set such that a content rate $X(=(\alpha_5+\alpha_7)/\alpha_1)$ of a total of voltage peak values $\alpha_5$ and $\alpha_7$ of the fifth-order component and the seventh-order component to a voltage peak value $\alpha_1$ of the first-order fundamental wave is in a range of $0.02 \leq X \leq 0.09$.

6. A method of controlling a brushless motor having a stator including teeth and armature windings for a plurality of phases, and a rotor including a permanent magnet and being rotatably disposed inside or outside of the stator, said method comprising:
    adjusting a configuration of the teeth of the stator, a configuration of the windings of the stator, and a number of poles of the rotor such that an inter-phase induced voltage waveform between two different phases in the armature windings is substantially trapezoidal.

7. A method of controlling a brushless motor according to claim 6, further comprising adjusting the configuration of the teeth of the stator, the configuration of the windings of the stator, and the number of poles of the rotor to superimpose an odd higher-order component except for a higher-order component of multiples of 3 on a first-order fundamental wave of the inter-phase induced voltage waveform.

8. A method of controlling a brushless motor according to claim 7, wherein said superimposing comprises superimposing a fifth-order component and a seventh-order component on the first-order fundamental wave of the inter-phase induced voltage waveform.

9. A method of controlling a brushless motor according to claim 8, wherein the configuration of the teeth of the stator, the configuration of the windings of the stator, and the number of poles of the rotor are adjusted such that a content rate $X(=(\alpha_5+\alpha_7)/\alpha_1)$ of a total of voltage peak values $\alpha_5$ and $\alpha_7$ of the fifth-order component and the seventh-order component to a voltage peak value $\alpha_1$ of the first-order fundamental wave is in a range of $0.01 \leq X \leq 0.1$.

10. A method of controlling a brushless motor according to claim 8, wherein the configuration of the teeth of the stator, the configuration of the windings of the stator, and the number of poles of the rotor are adjusted such that a content rate $X(=(\alpha_5+\alpha_7)/\alpha_1)$ of a total of voltage peak values $\alpha_5$ and $\alpha_7$ of the fifth-order component and the seventh-order component to a voltage peak value $\alpha_1$ of the first-order fundamental wave is in a range of $0.02 \leq X \leq 0.09$.

* * * * *